(12) United States Patent
Shimizu et al.

(10) Patent No.: US 9,783,227 B2
(45) Date of Patent: Oct. 10, 2017

(54) VEHICLE STEERING DEVICE

(71) Applicant: HONDA MOTOR CO., LTD., Minato-Ku, Tokyo (JP)

(72) Inventors: Yasuo Shimizu, Wako (JP); Atsuhiko Yoneda, Wako (JP); Yukihiro Wakakuwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/777,974

(22) PCT Filed: Mar. 11, 2014

(86) PCT No.: PCT/JP2014/056289
§ 371 (c)(1),
(2) Date: Sep. 17, 2015

(87) PCT Pub. No.: WO2014/148304
PCT Pub. Date: Sep. 25, 2014

(65) Prior Publication Data
US 2016/0280254 A1    Sep. 29, 2016

(30) Foreign Application Priority Data
Mar. 18, 2013  (JP) .................. 2013055450

(51) Int. Cl.
*B62D 5/04* (2006.01)
(52) U.S. Cl.
CPC ............. *B62D 5/0463* (2013.01); *B62D 5/04* (2013.01); *B62D 5/0484* (2013.01)
(58) Field of Classification Search
CPC ....... B62D 5/04; B62D 5/0463; B62D 5/0484
(Continued)

(56) References Cited

U.S. PATENT DOCUMENTS 5,828,972 A * 10/1998 Asanuma ............... B62D 5/006
180/446
6,208,923 B1 * 3/2001 Hommel ............... B62D 5/001
180/400
(Continued)

FOREIGN PATENT DOCUMENTS

DE        10157666 A1    6/2003
DE    102005022867 A1   12/2005
(Continued)

OTHER PUBLICATIONS

Office Action dated Jul. 11, 2016 corresponding to Chinese Patent Application No. 201480011519.8.
(Continued)

*Primary Examiner* — Tyler J Lee
(74) *Attorney, Agent, or Firm* — Carrier Blackman & Associates, P.C.; Joseph P. Carrier; Jeffrey T. Gedeon

(57) ABSTRACT

A vehicle steering device (11) is provided that performs steering of a vehicle in response to operation of a steering wheel (13) operated when the traveling direction of the vehicle is changed. The vehicle steering device (11) includes a first steering assist device having a first steering torque sensor (23), a first assist motor (51), and a first EPS control unit (37), and a second steering assist device having a second steering torque sensor (25), a second assist motor (57), and a second EPS control unit (39). The first and second EPS control units (37, 39) perform driving control of the first and second assist motors (51, 57) independently from each other. Even if either one of the two control units (37, 39) respectively controlling driving of the two assist motors (51, 57) fails into an abnormal situation, such an abnormal situation can be brought under control quickly and soundly.

11 Claims, 4 Drawing Sheets

(58) Field of Classification Search
USPC .................................................. 701/41–44
See application file for complete search history.

(56) References Cited

U.S. PATENT DOCUMENTS

| | | | | |
|---|---|---|---|---|
| 6,548,969 | B2* | 4/2003 | Ewbank | B62D 5/003 180/402 |
| 6,776,252 | B1* | 8/2004 | Andonian | B62D 5/003 180/402 |
| 6,885,922 | B2* | 4/2005 | Yao | B62D 5/003 701/32.9 |
| 7,130,728 | B2* | 10/2006 | Suzuki | B60T 8/885 180/402 |
| 7,154,244 | B2* | 12/2006 | Asaumi | H02K 7/1166 180/443 |
| 7,433,767 | B2* | 10/2008 | Takeuchi | B62D 5/003 180/443 |
| 2002/0093298 | A1* | 7/2002 | Walter | B60T 7/042 318/34 |
| 2004/0020708 | A1* | 2/2004 | Szabela | B62D 5/001 180/446 |
| 2004/0193344 | A1* | 9/2004 | Suzuki | B60T 8/885 701/41 |
| 2005/0159866 | A1* | 7/2005 | Takeuchi | B62D 5/003 701/41 |
| 2005/0257992 | A1 | 11/2005 | Shiino et al. | |
| 2008/0184838 | A1* | 8/2008 | Hayashi | B62D 5/008 74/484 R |
| 2009/0173566 | A1* | 7/2009 | Ogasawara | B62D 5/008 180/446 |
| 2009/0314573 | A1* | 12/2009 | Oniwa | B62D 5/046 180/446 |
| 2011/0010051 | A1 | 1/2011 | Ura | |

FOREIGN PATENT DOCUMENTS

| | | |
|---|---|---|
| DE | 102012101006 A1 | 8/2013 |
| JP | 2003-112636 A | 4/2003 |
| JP | 2004-142622 A | 5/2004 |
| JP | 2004243995 A | 9/2004 |
| JP | 2005-247214 A | 9/2005 |
| JP | 2008-114726 A | 5/2008 |
| JP | 2008168658 A | 7/2008 |
| JP | 2009073446 A | 4/2009 |
| JP | 2011020481 | 2/2011 |
| WO | 2012042351 A1 | 4/2012 |
| WO | 2012052817 A1 | 4/2012 |

OTHER PUBLICATIONS

Office Action dated Nov. 1, 2016 for corresponding Japanese Patent Application No. 2015-506708.
Office Action dated Nov. 24, 2016 corresponding to German Patent Application No. 11 2014 001 505.9.

* cited by examiner

VEHICLE STEERING DEVICE

TECHNICAL FIELD

The present invention relates to a vehicle steering device to be used for changing the traveling direction of a vehicle as desired.

BACKGROUND OF THE INVENTION

A recent vehicle is mounted with a vehicle steering device that uses a motor to apply an assist force for a driver steering the steering wheel. If such a vehicle steering device is applied to a vehicle having a large axle weight, such as a large car, a larger steering force is required as compared to that for a small vehicle having a small axle weight, such as a small car. Then, a larger force is required to assist the steering.

To accommodate these cases, for example, the Japanese Patent Application Publication No. 2004-142622 discloses a steering device having two motors, two steering torque sensors, and two ECUs that perform driving control of the two motors, respectively.

More specifically, in the steering device according to the Japanese Patent Application Publication No. 2004-142622, a steering wheel, column unit, an intermediate transmission unit and a gearbox unit are connected in this order. The column unit and the gearbox unit are respectively provided with a first and second motors that apply assist forces for steering, and a first and second torque sensors that detect the torque applied to the steering shaft. The first and second motors are respectively connected with a first and second ECUs that provide motor driving signals to the motors.

The steering device according to the Japanese Patent Application Publication No. 2004-142622 allows for improving workability and mountability when attaching the gearbox unit to the vehicle body, as well as for improving operation feeling of the operator.

SUMMARY OF THE INVENTION

Problems to be Solved

However, in the steering device according to the Japanese Patent Application Publication No. 2004-142622, if some failure occurs in one of the two ECUs to cause the assist motor controlled by that ECU to start driving with a different torque from the steering torque to be normally applied, it is difficult to bring negative effect due to such a failure under control quickly and soundly.

The present invention has been made for solving the above problem to provide a vehicle steering device that allows, for example, even if some failure occurs in either one of the two control units which respectively control driving of two assist motors, for bringing negative effect due to such a failure under control quickly and soundly.

Solution to Problem

In order to achieve the above objective, the invention of a first aspect provides a vehicle steering device that includes a steering member to be operated to change the traveling direction of a vehicle to perform steering of the vehicle in response to operation of the steering member, and further includes, as the most primary features: a first steering assist device having at least a first steering torque sensor, a first assist motor that applies an assist force for steering to the steering member, and a first control unit; and a second steering assist device having at least a second steering torque sensor, a second assist motor that applies an assist force for steering to the steering member, and a second control unit, wherein the first and second assist motors are mutually coupled via a steering force transmission mechanism, the first and second steering torque sensors are arranged between one of the first and second assist motors, which is located near the steering member, and the steering member, the first control unit performs driving control of the first assist motor so as to apply an assist force at least based on a first steering torque detected by the first steering torque sensor, and the second control unit performs driving control of the second assist motor so as to apply an assist force at least based on a second steering torque detected by the second steering torque sensor, wherein the first and second control units perform the driving control independently from each other.

In the invention of the first aspect, let's assume that some failure has occurred in the first control unit in the system of the first steering assist device, which is one of the first and second steering assist devices, to cause negative effect in the first assist motor. Nevertheless, the first and second assist motors are mutually coupled via the steering force transmission mechanism. Besides, the first and second assist motors are located downstream (in the direction of transmitting the steering force) of the first and second steering torque sensors, as viewed from the steering member. This causes the steering torque to be applied to the steering member operated by the driver, in the direction to cancel the rotational force of the first assist motor which has suffered from negative effect due to the failure. The steering torque including this intention of the driver is inputted to the first and second steering torque sensors. Accordingly, driving control of the second assist motor is performed by the second control unit in the system of the second steering assist device which is normal, in the direction to suppress the rotational force of the first assist motor. As a result, negative effect caused by the failure in the first assist motor is eased.

Therefore, according to the invention of the first aspect, for example, even if some failure occurs in either one of the two control units which respectively control driving of the two assist motors, negative effect due to such a failure can be brought under control quickly and soundly.

In addition, the invention of a second aspect provides the vehicle steering device described in the invention of the first aspect, wherein the first and second assist motors have respective electrical characteristics to be set mutually in common.

In the invention of the second aspect, even if some failure occurs in either one of the first and second assist motors, such a situation will be avoided where the magnitude of the output of the motor which has suffered from the failure overcomes the magnitude of the output of the motor which works correctly, to turn steered wheels to the degree of causing discomfort to the driver, because the magnitude of the output of the motor which works correctly is equal to the magnitude of the output of the motor which has suffered from the failure.

Besides, as the first and second assist motors having the electrical characteristics set to be in common are mutually coupled via a steering force transmission mechanism, the invention of the second aspect allows for suppressing the output characteristics of individual motors lower, as compared with the case of driving the steering with a single motor. This allows, for example, for supplying power to operate the motors from an existing battery having 12-volt capacitance, and no new booster circuit for 24-volt or 48-volt capacitance is required. As a result, individual motors can be reduced in size to secure the degree of freedom in layout design.

Further, the invention of a third aspect provides the vehicle steering device described as the invention of the first aspect, wherein the first and second control units are respectively accommodated in a common housing.

Furthermore, the invention of a fourth aspect provides the vehicle steering device described as the invention of the first aspect, wherein components in the first steering assist device and corresponding components in the second steering assist device are respectively arranged in the vehicle so as to be located in mutually different environments.

Adopting such a configuration as provided by the invention of the fourth aspect, in which the components in the first steering assist device and the corresponding components in the second steering assist device are respectively arranged in the vehicle so as to be located in mutually different environments, can increase tolerance to abnormal conditions due to environmental changes such as the vehicle being submerged, as compared with the case where the components in the first steering assist device and the corresponding components in the second steering assist device are respectively arranged in the vehicle so as to be located in a common environment.

As a result, the invention of the fourth aspect allows for increasing cases where the invention of the first aspect exerts desired advantageous effects, such as bringing negative effect due to a failure under control rapidly and soundly.

Moreover, the invention of a fifth aspect provides the vehicle steering device described as the invention of the third aspect, wherein being located in mutually different environments includes being located at mutually different heights.

Adopting such a configuration as provided by the invention of the fifth aspect, in which the components in the first steering assist device and the corresponding components in the second steering assist device are respectively arranged in the vehicle so as to be located at mutually different heights, can increase tolerance to abnormal conditions due to environmental changes such as the vehicle being submerged, as compared with the case where the components in the first steering assist device and the corresponding components in the second steering assist device are respectively arranged in the vehicle so as to be located at a common height.

As a result, the invention of the fifth aspect allows for further increasing cases where the invention of the third aspect exerts desired advantageous effects, such as bringing negative effect due to a failure under control rapidly and soundly.

Moreover, the invention of a sixth aspect provides the vehicle steering device described as the invention of the first aspect, wherein one of the first and second control units is installed inside the vehicle compartment, while the other thereof is installed outside the vehicle compartment.

Adopting such a configuration as provided by the invention of the sixth aspect, in which one of the first and second control units is installed inside the vehicle compartment, while the other thereof is installed outside the vehicle compartment, can increase tolerance to abnormal conditions due to environmental changes such as the vehicle being submerged or temperature changes, as compared with the case where both the first and second control units are installed on the same side, i.e., inside or outside the vehicle compartment.

As a result, the invention of the sixth aspect allows for furthermore increasing cases where the invention of the first aspect exerts desired advantageous effects, such as bringing negative effect due to a failure under control rapidly and soundly.

Moreover, the invention of a seventh aspect provides the vehicle steering device described as the invention of the first aspect, wherein the first and second control units are installed in the vehicle so as to be located at mutually different heights.

Adopting such a configuration as provided by the invention of the seventh aspect, in which the first and second control units are installed in the vehicle so as to be located at mutually different heights, can increase tolerance to abnormal conditions due to environmental changes such as the vehicle being submerged, as compared with the case where both the first and second control units are installed in the vehicle so as to be located at a common height.

As a result, the invention of the seventh aspect, as is the case with the invention of the fifth aspect, allows for further increasing cases where the invention of the first aspect exerts desired advantageous effects, such as bringing negative effect due to a failure under control rapidly and soundly.

Moreover, the invention of an eighth aspect provides the vehicle steering device described as the invention of the sixth aspect, wherein the first and second assist motors are set to have mutually different electrical characteristics. More specifically, according to the invention of the eighth aspect, for example, one motor located in an environment requiring relatively high tolerance (e.g., inside the vehicle compartment) are set to have larger electrical characteristics than those of the other motor located in an environment requiring relatively low tolerance (e.g., outside the vehicle compartment).

Adopting such a configuration as provided by the invention of the eighth aspect, in which the first and second assist motors are set to have mutually different electrical characteristics (e.g., rated torque characteristics), more specifically, for example, with one motor located in an environment requiring relatively high tolerance being set to have larger electrical characteristics than those of the other motor located in an environment requiring relatively low tolerance, will allow, even if some failure occurs in the other motor of the first and second assist motors which is located in the environment requiring relatively low tolerance, for suitably avoiding a situation in which the driver feels discomfort, because the one motor, which is located in the environment requiring relatively high tolerance and set to have larger electrical characteristics, strongly suppresses the negative effect caused by the failure that has occurred in the other motor.

Moreover, the invention of a ninth aspect provides the vehicle steering device described as the invention of the first aspect, wherein a first electric wire that electrically connects the first assist motor and the first control unit, and a second electric wire that electrically connects the second assist motor and the second control unit are routed so as to pass through mutually different paths within the vehicle.

Adopting such a configuration as provided by the invention of the ninth aspect, in which the first and second electric wires are routed so as to pass through mutually different paths within the vehicle, will allow, even if one of the first and second electric wires is damaged, for suppressing probability of the other electric wire being damaged at the same time at a low level.

As a result, the invention of the ninth aspect allows for increasing cases where the invention of the first aspect exerts desired advantageous effects, such as bringing negative effect due to a failure under control rapidly and soundly.

Moreover, the invention of a tenth aspect provides the vehicle steering device described as the invention of the first aspect, wherein at least one of the first and second steering torque sensors is a magnetostrictive torque sensor.

Adopting such a configuration as provided by the invention of the tenth aspect, in which at least one of the first and second steering torque sensors is a magnetostrictive torque sensor, allows for strengthening the torsional rigidity of the steering member. As a result, even with two steering torque sensors installed on the steering shaft, a situation can be suppressed where the steering shaft is excessively twisted due to the operating force of the steering member by the driver, to improve the driver's operation feeling for the steering.

Advantageous Effects of the Invention

The vehicle steering device of the present invention allows, for example, even if some failure occurs in one of the two control units that control driving of the respective two assist motors, for bringing negative effect due to such a failure under control rapidly and soundly.

EMBODIMENTS OF THE INVENTION

Figure 1:
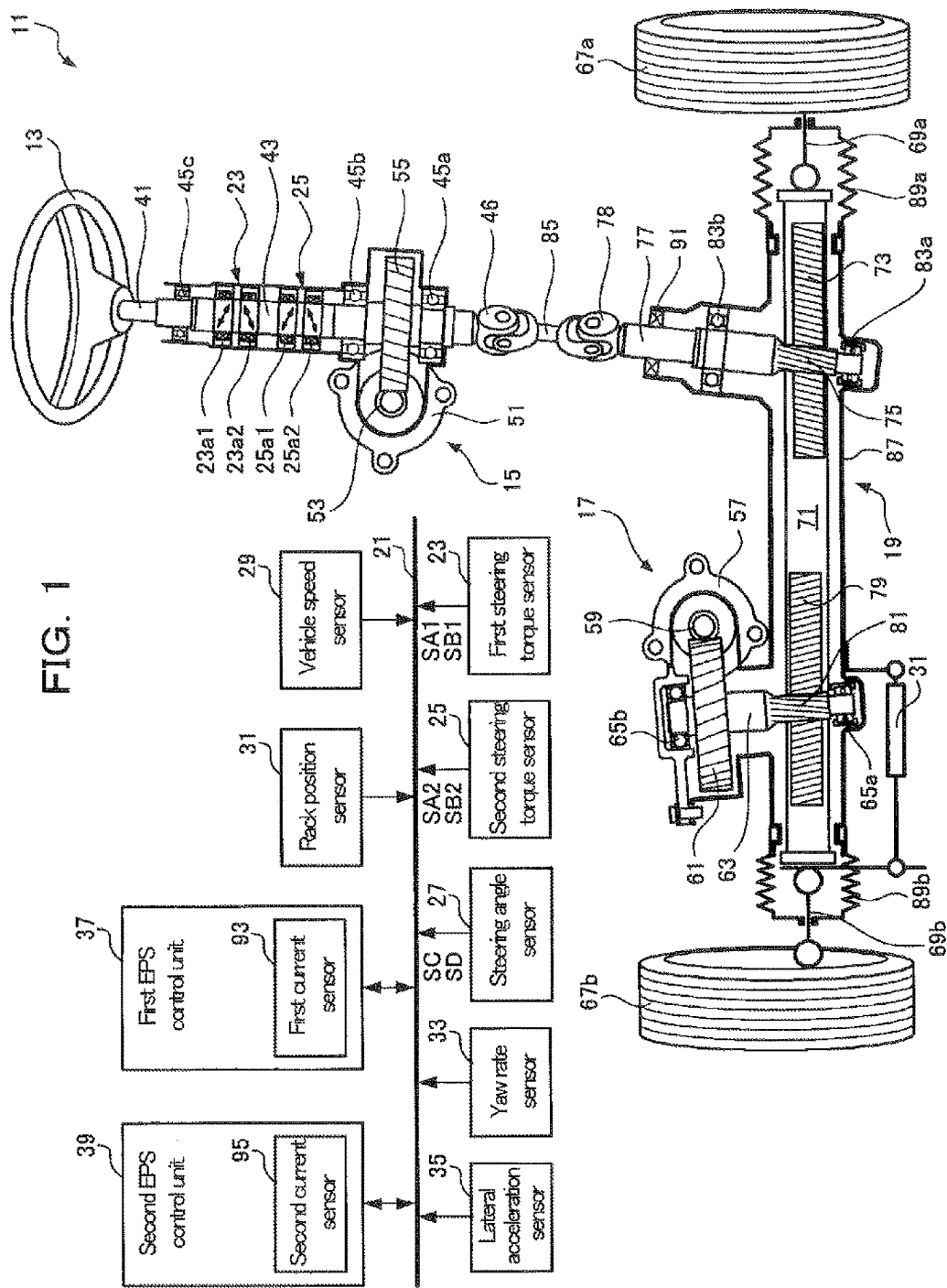
FIG. 1 is a block diagram showing the outline of a vehicle steering device according to an embodiment of the present invention.

Hereinafter, a description will be given in detail of vehicle steering devices according to embodiments of the present invention, with reference to the drawings.

Note that in the drawings shown hereinafter, members having common functions, or members having functions corresponding to each other will principally be denoted by common reference numerals. In addition, the size and shape of the members may schematically be shown as being deformed or exaggerated, for convenience of explanation in some cases.

First Embodiment

Summary of Vehicle Steering Device 11

Hereinafter, a description will be given in detail of a vehicle steering device according to an embodiment of the present invention, with reference to the drawings.

FIG. 1 is a block diagram showing the outline of a vehicle steering device 11 according to the embodiment of the present invention.

The vehicle steering system 11 according to the embodiment of the present invention includes, as shown in FIG. 1: a steering wheel 13; a first and second steering assist force generating device 15, 17; a steering device 19; a communication medium 21 such as a Controller Area Network (CAN); a first and second steering torque sensors 23, 25; a steering angle sensor 27; a vehicle speed sensor 29 that detects the speed of the vehicle (vehicle speed); a rack position sensor 31; a yaw rate sensor 33 that detects a yaw rate of the vehicle; a lateral acceleration sensor 35 that detects lateral acceleration of the vehicle; and a first and second electric power steering (hereinafter, "Electric Power Steering" may be abbreviated as "EPS") control units 37, 39.

The steering wheel 13 corresponding to the "steering member" of the present invention is used when the traveling direction of the vehicle (not shown) is changed to a desired direction. At the center of the steering wheel 13 in a substantially annular shape, a first and second steering shafts 41, 43 are connected in series. The second steering shaft 43 is rotatably supported at a lower portion, an intermediate portion, and an upper portion via bearings 45a, 45b, 45c, respectively. A first universal joint 46 is arranged at a lower end of the second steering shaft 43. The first and second steering torque sensors 23, 25 are respectively arranged on the second steering shaft 43 along the axial direction of the second steering shaft 43.

The first steering torque sensor 23 has a function of detecting the magnitude and direction of the steering torque inputted from the steering wheel 13, for example, using a pair of solenoid coils 23a1,23a2.

If the first steering torque sensor 23 works correctly, the sum of first steering torque signals SA1, SB1 detected by the first steering torque sensor 23 always converges within a predetermined range. It is because each of the first steering torque signals SA1, SB1 has a linear characteristic which is opposite to each other. In addition, if the coils 23a1,23a2 are disconnected or a component failure occurs in a circuit, there is a tendency that either one of the first steering torque signals SA1, SB1 rapidly varies. Furthermore, if an error occurs in the first steering torque sensor 23, there is a tendency that either one of the first steering torque signals SA1, SB1 matches with the power supply potential or the earth potential.

In short, the first EPS control unit 37 can perform an error diagnosis of the first steering torque sensor 23, by monitoring whether the sum of the first steering torque signals SA1, SB1 detected by the first steering torque sensor 23 converges within a predetermined range, and whether either one of the first steering torque signals SA1, SB1 shows a tendency of varying rapidly. The first steering torque signals SA1, SB1 detected by the first steering torque sensor 23 is fed to the first EPS control unit 37 via the communication medium 21.

Likewise, the second steering torque sensor 25 has a function of detecting the magnitude and direction of the steering torque inputted from the steering wheel 13, for example, using a pair of solenoid coils 25a1,25a2.

If the second steering torque sensor 25 works correctly, the sum of second steering torque signals SA2, SB2 detected by the second steering torque sensor 25 always converges within a predetermined range. It is because each of the second steering torque signals SA2, SB2 detected by the second steering torque sensor 25 has a characteristic which is opposite to each other. In addition, if the coils 25a1, 25a2 are disconnected or a component failure occurs in a circuit, there is a tendency that either one of the second steering torque signals SA2, SB2 rapidly varies.

In short, the second EPS control unit 39 can perform an error diagnosis of the second steering torque sensor 25, by monitoring whether the sum of the second steering torque signals SA2, SB2 detected by the second steering torque sensor 25 converges within a predetermined range, and whether either one of the second steering torque signals SA2, SB2 shows a tendency of varying rapidly. The second steering torque signals SA2, SB2 detected by the second steering torque sensor 25 is fed to the second EPS control unit 39 via the communication medium 21.

The first and second steering torque sensors 23 and 25 may preferably be set to have large distance between each other (for example, more than a width of magnetostrictive plating which is effective to improve the detection precision), so that, even if an error occurs in either one of the sensors, another sensor which is working correctly is not affected (magnetically interfered) by the sensor which is in error. In addition, a magnetic shielding plate may preferably be provided between the first and second steering torque sensors 23 and 25, to prevent mutual influence (magnetic interference) between the first and second steering torque sensors 23, 25. Further, a common magnetostrictive plating portion may be provided to have the coils 23a1,23a2 and the coils 25a1,25a2 separately mounted thereon. Furthermore, the coils 23a1,23a2 and the coils 25a1,25a2 can be replaced, for example, by a plurality of Hall elements separately provided to employ a configuration for detecting steering torque of two systems.

The first and second steering assist force generating devices 15 and 17 have functions of generating the assist force for steering of the steering wheel 13 by the driver. The first and second steering assist force generating devices 15, 17 normally supply assist forces for steering, respectively, to operate so as to generate a desired assist force as a whole.

The first steering assist force generating device 15 of column-assist type is configured to include a first assist motor 51 that supplies an assist force for reducing the steering force of the steering wheel 13 by the driver, and a first worm wheel gear 55 that meshes with a first worm gear 53 arranged on an output shaft of the first assist motor 51. The first worm wheel gear 55 is arranged on the second steering shaft 43, with the second steering shaft 43 as the rotation center.

The first worm wheel gear 55 is provided with the steering angle sensor 27. The steering angle sensor 27 has a function of detecting the magnitude and direction of the steering angle inputted from the steering wheel 13, for example, by using a pair of rotation angle sensors (not shown) such as two potentiometers. Rotation angle signals for the steering of the steering wheel 13 (steering angle signals) SC, SD, detected by the steering angle sensor 27 and both being equivalent signals, are inputted via the communication medium 21 to the first and second EPS control units 37, 39, respectively.

The first assist motor 51 may employ, for example, a stator (not shown) having a plurality of field coils, and a three-phase brushless motor having a rotor (not shown) that rotates inside the stator. However, a DC brush motor may also be used for the first assist motor 51.

On the other hand, the second steering assist force generating device 17 of rack assist type is configured to include a second assist motor 57 that supplies an assist force for reducing the steering force of the steering wheel 13 by the driver, and a second worm wheel gear 61 that meshes with a second worm gear 59 arranged on an output shaft of the second assist motor 57. The second worm wheel gear 61 is arranged on a second pinion shaft 63 to be described later, with the second pinion shaft 63 as the rotation center.

A ball screw mechanism (not shown) can be employed instead of the second worm wheel gear 61 that meshes with the second worm gear 59. This ball screw mechanism is configured to include: a rack shaft 71 in a substantially cylindrical shape with a helical screw groove engraved on an outer peripheral surface; a nut engraved with a helical screw groove, which is equivalent to the above-mentioned screw groove, on an inner peripheral surface of a through-hole; and a plurality of circulating balls that are fitted loosely in a space which is formed by both the screw groove of the rack shaft 71 and the screw groove of the nut, and helically extends. In this case, the output shaft of the second assist motor 57 is connected to the nut directly or via a deceleration mechanism (not shown).

The second pinion shaft 63 is rotatably supported at both ends in the axial direction through bearings 65a, 65b, respectively.

The second assist motor 57 can, for example, employ a three-phase brushless motor, like the first assist motor 51. However, a DC brush motor may be used for the second assist motor 57.

The steering device 19 has a function of transmitting the steering force of the steering wheel 13 by the driver to a pair of steered wheels 67a, 67b in the vehicle width direction. To be in more detail, the steering device 19 is configured to have: the rack shaft 71 that is connected to the pair of steered wheels 67a, 67b through tie rods 69a, 69b; a first pinion gear 75 that meshes with a first rack teeth 73 provided on the rack shaft 71; a first pinion shaft 77 that is provided with the pinion gear 75 on one end; a second pinion gear 81 that meshes with a second rack teeth 79 provided on the rack shaft 71; and the second pinion shaft 63 that is provided with a second pinion gear 81 on one end, respectively.

The first pinion shaft 77 is rotatably supported at a lower portion and an intermediate portion through bearings 83a, 83b, respectively. A second universal joint 78 is provided at the upper end of the first pinion shaft 77. The first universal joint 46 provided at the lower end of the second steering shaft 43 and the second universal joint 78 provided at the upper end of first pinion shaft 77 are connected via a link portion 85.

The rack position sensor 31 is provided for detecting the position in the axial direction of the rack shaft 71 between one end (the left side of the drawing sheet) of the rack shaft 71 and the housing 87 that covers components such as the rack shaft 71. Position detection signals of this rack position sensor 31 are fed via the communication medium 21 to the first and second EPS control units 37, 39. Openings of the housing 87 are kept liquid-tight by a combination of dust seals 89a, 89b and an oil seal 91.

A "steering force transmission mechanism" of the present invention (claim 1) is provided so as to intervene between the first worm gear 53 provided on the output shaft of the first assist motor 51, and the second worm gear 59 provided on the output shaft of the second assist motor 57.

Note that, in the vehicle steering device 11 according to the embodiment of the present invention, the "steering force transmission mechanism" is constituted with the first worm wheel gear 55, the second steering shaft 43, the first universal joint 46, the link portion 85, the second universal joint 78, the first pinion shaft 77, the second pinion shaft 63, and the second worm wheel gear 61.

The first EPS control unit 37 corresponding to a "first control unit" of the present invention has a function of performing the driving control of the first assist motor 51 so as to apply an assist force based on various signals such as the first steering torque signals SA1, SB1 which are detected by the first steering torque sensor 23, the steering angle signals SC, SD which are detected by the steering angle sensor 27, a vehicle speed signal detected by the vehicle speed sensor 29. The first EPS control unit 37 is configured to include an interface circuit for data input and output, a computer for control operation, a first timer circuit for error diagnosis, and a first FET bridge circuit for driving the first assist motor 51 (none of them are shown).

In addition, the first EPS control unit 37 is provided with a first current sensor 93 for detecting a first current value of the first assist motor 51. The first current value detected by the first current sensor 93 is sent to the second EPS control unit 39, as well as being referenced in the first EPS control unit 37 such as when performing error diagnosis of the first assist motor 51.

On the other hand, the second EPS control unit 39 corresponding to a "second control unit" of the present invention has a function of performing the driving control of the second assist motor 57 so as to apply an assist force based on various signals such as the second steering torque signals SA2, SB2 which are detected by the second steering torque sensor 25, the steering angle signals SC, SD which are detected by the steering angle sensor 27, the vehicle speed signal detected by the vehicle speed sensor 29. The second EPS control unit 39 is, in the same manner as the first EPS control unit 37, configured to include an interface circuit for data input and output, a computer for control operation, a second timer circuit for error diagnosis, and a second FET bridge circuit for driving the second assist motor 57 (none of them are shown).

In addition, the second EPS control unit 39 is provided with a second current sensor 95 for detecting a second current value of the second assist motor 57. The second current value detected by the second current sensor 95 is sent to the first EPS control unit 37, and also referenced in the second EPS control unit 39, for example, for performing error diagnosis of the second assist motor 57.

For the steering operation of the vehicle steering device 11 configured as described above, an exemplary case will be described where the first and second assist motors 51, 57 are not driven due to some error (i.e., EPS assist control is not performed), with reference to FIG. 1.

When the driver operates turning the steering wheel 13, its steering force is converted into axial movement of the rack shaft 71 having the first rack teeth 73 and transmitted, via the first steering shaft 41, the second steering shaft 43, the first universal joint 46, the link portion 85, the second universal joint 78, and the first pinion gear 75 of the first pinion shaft 77, respectively. As a result, the pair of steered wheels 67a, 67b are operated so as to be steered through the tie rods 69a, 69b, respectively.

Next, for the steering operation of the vehicle steering device 11, an exemplary case will be described where both the first and second assist motors 51, 57 are operating correctly (i.e., EPS assist control is performed), with reference to FIG. 1.

In this case, the first and second EPS control units 37, 39 respectively calculate, by a predetermined operation, suitable assist forces for assisting the steering force by the driver, to perform driving control of the first and second assist motors 51, 57 so as to achieve the calculated assist forces. This allows, at the time when the steering wheel 13 is steered, for changing the traveling direction of the vehicle as desired and comfortably with a suitable assist force for steering.

Operation of Vehicle Steering Device 11

Next, a description will be given of the operation of the vehicle steering device 11 according to the embodiment of the present invention, with reference to FIGS. 2 and 3 as appropriate.

Figure 2:
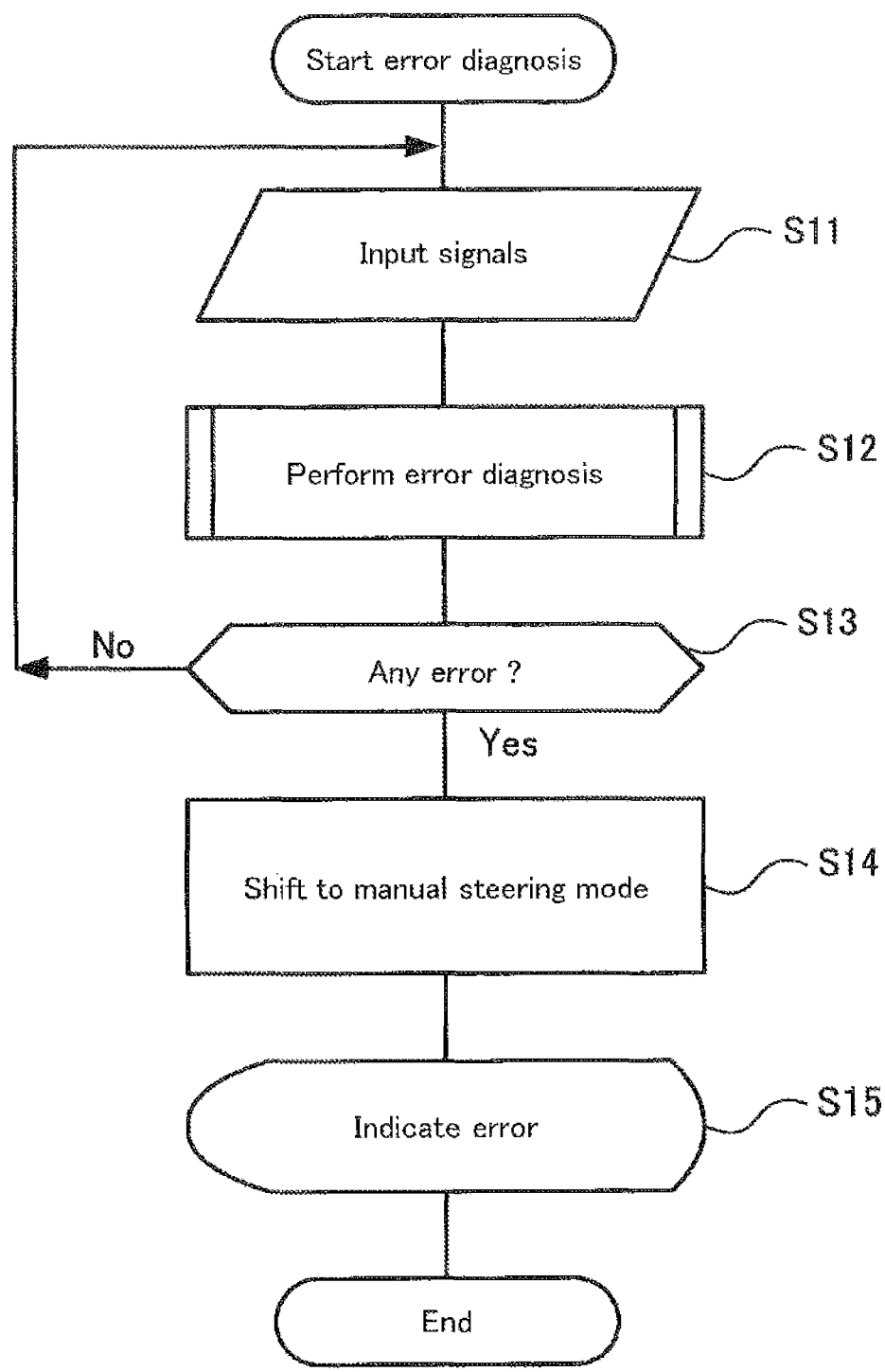
FIG. 2 is a flowchart showing an error diagnosis process in the operation of the vehicle steering device according to the embodiment of the present invention.

FIG. 2 is a flowchart diagram showing an error diagnosis process performed by the vehicle steering device 11 according to the embodiment of the present invention. FIG. 3 is a flowchart diagram showing an assist control process performed by the vehicle steering device 11 according to the embodiment of the present invention.

First, when the driver turns on the ignition key switch (not shown), the first and second EPS control units 37, 39 are respectively supplied with power through fuses from the vehicle battery (neither of them are shown). Then, the first and second EPS control units 37, 39 execute in parallel the error diagnosis process shown in FIG. 2 and the assist control process shown in FIG. 3, repeatedly at a predetermined cycle. The error diagnosis process is executed, for example, in a cycle of every millisecond. The assist control process is executed, for example, in a cycle of every 0.5 milliseconds.

Note that, in the first and second EPS control units 37, 39, an EPS control mode that represents an ON/OFF state of the assist force for steering is assumed to be set in the assist control mode that represents the ON state of the assist force for steering.

First, a description will be given of the operation of the first EPS control unit 37.

In step S11 of the error diagnosis process shown in FIG. 2, the first EPS control unit 37 is inputted with signals from various sensors via the communication medium 21. The various sensors above include the first steering torque sensor 23, the steering angle sensor 27, the vehicle speed sensor 29, the rack position sensor 31, the yaw rate sensor 33, the lateral acceleration sensor 35, the first and second current sensors 93, 95, inter-terminal voltage sensors and rotation angle sensors (resolvers) of the first and second assist motors 51, 57, and an engine speed sensor.

In step S12, the first EPS control unit 37 performs the error diagnosis process. In the error diagnosis process, the first EPS control unit 37 diagnoses whether or not various sensors 23, 27, 29, 31, 33, 35, 93, 95, the first assist motor 51, and various functional portions inclusive of the first EPS control unit 37 are respectively normal.

For example, the first EPS control unit 37 diagnoses the first steering torque sensor 23 as being normal, if the sum of the first steering torque signals SA1, SB1 obtained from the first steering torque sensors 23 converges into a predetermined range, while as being abnormal, if the sum of the first steering torque signals SA1, SB1 deviates from the predetermined range.

In addition, the first EPS control unit 37 diagnoses the first steering torque sensor 23 as being abnormal, if either one of the first steering torque signals SA1, SB1 tends to fluctuate sharply or tends to match with the power supply potential or earth potential.

Further, the first EPS control unit 37 compares a motor current command signal computed based on the function SC1 (see Equation 1) of deviation between the first steering torque signals SA1, SB1 with the first current value of the first assist motor 51 obtained from the first current sensor 93, and, if the deviation between the motor current command value based on the motor current command signal and the first current value exceeds a first current deviation threshold value that is determined in advance, diagnoses the system of the first assist motor 51 (inclusive of the first current sensor 93, the first FET bridge circuit, a power supply line) as being abnormal.

$$SC1 = k1*(SA1 - SB1) + T1 \text{ [V]} \qquad \text{(Equation 1)}$$

where k1 is a proportional constant to be defined as appropriate, and T1 is a constant to be defined as appropriate.

Furthermore, the first EPS control unit 37 compares a detected vehicle speed value obtained from the vehicle speed sensor 29 with engine speed information obtained from the engine speed sensor, and, if the detected vehicle speed value is not a value commensurate with the engine speed information, diagnoses the vehicle speed sensor 29 as being abnormal.

Note that the various sensors 23, 27, 29, 31, 33, 35, 93, 95 may be multiplexed (duplexed) in advance, and the first EPS control unit 37 may compare detection signals of the corresponding sensors (for example, a pair of speed sensors) with each other among the multiplexed (duplicated) sensors, and may diagnose whether or not the various sensors are normal based on whether or not they match with each other (inclusive of a case where the deviation converges within a predetermined allowable range, and as will also be the same hereinafter).

Moreover, a configuration may be adopted in which the first EPS control unit 37 compares the first current value of the first assist motor 51 obtained from the first current sensor 93 with the second current value of the second assist motor 57 obtained from the second current sensor 95, and diagnoses, based on whether or not they match with each other, either one of the first current sensor 93 and the second current sensor 95 as being abnormal. This allows for simplifying the system configuration, because error diagnosis can be performed without multiplexing the first current sensor 93 and the second current sensor 95.

Referring back to FIG. 2, in step S13, if the error diagnosis result in step S12 shows no error (normal) based on the error diagnosis for the various sensors 23, 27, 29, 31, 33, 35, 93, 95, the first assist motor 51, and various functional portions inclusive of the first EPS control unit 37 (No in step S13), the first EPS control unit 37 returns the processing to step S11, to cause step S11 and the following steps to be sequentially performed.

On the other hand, in step 313, if the error diagnosis result in step S12 shows an error (Yes in step S13), the first EPS control unit 37 proceeds with the processing to the next step 314.

In step S14, the first EPS control unit 37 performs control to shift an EPS control mode representative of the ON/OFF state of the assist force for steering from an assist control mode representative of the ON state of the assist force for steering to a manual steering mode representative of the OFF state of the assist force for steering. This shift to the manual steering mode may be achieved, for example, by the first EPS control unit 37 interrupting the power supply to the first FET bridge circuit for driving the first assist motor 51.

In step S15, if the error diagnosis result for the various sensors 23, 27, 29, 31, 33, 35, 93, 95, the first assist motor 51, and the various functional portions inclusive of the first EPS control unit 37 shows an error (Yes in step S13), the first EPS control unit 37 turns on a warning lamp provided on an instrument panel of a vehicle (not shown), as well as performs control to indicate the portion diagnosed to be in error. This indication of the portion diagnosed to be in error, such as the first steering assist force generating device 15, various functional portions inclusive of the first EPS control unit 37, and various sensors, can facilitate maintenance of the vehicle steering device 11.

After that, the first EPS control unit 37 completes a series of processing in the error diagnosis process.

Next, a description will be given of the operation of the second EPS control unit 39. The operation of the second EPS control unit 39 is substantially equivalent to that of the first EPS control unit 37. However, the operation of the first EPS control unit 37 and that of the second EPS control unit 39 are independent from each other.

That is, in step S11 of the error diagnosis process shown in FIG. 2, the second EPS control unit 39 is inputted with signals from various sensors via the communication medium 21. The various sensors above includes the second steering torque sensor 25, the steering angle sensor 27, the vehicle speed sensor 29, the rack position sensor 31, the yaw rate sensor 33, the lateral acceleration sensor 35, the first and second current sensors 93, 95, the inter-terminal voltage sensors and the rotation angle sensors (resolvers) of the first and second assist motors 51, 57, and the engine speed sensor.

In step S12, the second EPS control unit 39 performs the error diagnosis process. In the error diagnosis process, the second EPS control unit 39 diagnoses whether or not various sensors 25, 27, 29, 31, 33, 35, 93, 95, the second assist motor 57, and various functional portions inclusive of the second EPS control unit 39 are respectively normal.

For example, the second EPS control unit 39 diagnoses the second steering torque sensor 25 as being normal, if the sum of the second steering torque signals SA2, SB2 obtained from the second steering torque sensors 25 converges into a predetermined range, while diagnoses the second steering torque sensor 25 as being abnormal, if the sum of the second steering torque signals SA2, SB2 deviates from the predetermined range.

In addition, the second EPS control unit 39 diagnoses the second steering torque sensor 25 as being abnormal, if either one of the second steering torque signals SA2, SB2 tends to fluctuate sharply or tends to match with the power supply potential or earth potential.

Further, the second EPS control unit 39 compares a motor current command signal computed based on the function SC2 (see Equation 2) of deviation between the second steering torque signals SA2, SB2 with the second current value of the second assist motor 57 obtained from the second current sensor 95, and, if the deviation between the motor current command value based on the motor current command signal and the second current value exceeds a second current deviation threshold value that is determined in advance, diagnoses the system of the second assist motor 57 (inclusive of the second current sensor 95, the second FET bridge circuit, a power supply line) as being abnormal.

$$SC2 = k2*(SA2-SB2)+12 \ [V] \qquad \text{(Equation 2)}$$

where k2 is a proportional constant to be defined as appropriate, and T2 is a constant to be defined as appropriate.

Furthermore, the second EPS control unit 39 compares the detected vehicle speed value obtained from the vehicle speed sensor 29 with the engine speed information obtained from the engine speed sensor, and, if the detected vehicle speed value is not a value commensurate with the engine speed information, diagnoses the vehicle speed sensor 29 as being abnormal.

Note that the various sensors 25, 27, 29, 31, 33, 35, 93, 95 may be multiplexed (duplexed) in advance, and the second EPS control unit 39 may compare detection signals of the corresponding sensors (for example, a pair of speed sensors) with each other among the multiplexed (duplicated) sensors, and may diagnose whether or not the various sensors are normal based on whether or not they match with each other (inclusive of a case where the deviation converges within a predetermined allowable range, and as will also be the same hereinafter).

Moreover, a configuration may be adopted in which the second EPS control unit 39 compares the first current value of the first assist motor 51 obtained from the first current sensor 93 with the second current value of the second assist motor 57 obtained from the second current sensor 95, and diagnoses, based on whether or not they match with each other, either one of the first current sensor 93 and the second current sensor 95 as being abnormal. This allows for simplifying the system configuration, because error diagnosis can be performed without multiplexing the first current sensor 93 and the second current sensor 95.

Referring back to FIG. 2, in step S13, if the error diagnosis result in step S12 shows no error (normal) based on the error diagnosis for the various sensors 25, 27, 29, 31, 33, 35, 93, 95, the second assist motor 57, and various functional portions inclusive of the second EPS control unit 39 (No in step S13), the second EPS control unit 39 returns the processing to step S11, to cause step S11 and the following steps to be sequentially performed.

On the other hand, in step S13, if the error diagnosis result in step S12 shows an error (Yes in step S13), the second EPS control unit 39 proceeds with the processing to the next step S14.

In step S14, the second EPS control unit 39 performs control to shift an EPS control mode representative of the ON/OFF state of the assist force for steering from an assist control mode representative of the ON state of the assist force for steering to a manual steering mode representative of the OFF state of the assist force for steering. This shift to the manual steering mode may be achieved, for example, by the second EPS control unit 39 interrupting the power supply to the second FET bridge circuit for driving the second assist motor 57.

In step S15, if the error diagnosis result for the various sensors 25, 27, 29, 31, 33, 35, 93, 95, the second assist motor 57, and the various functional portions inclusive of the second EPS control unit 39 shows an error (Yes in step S13), the second EPS control unit 39 turns on the warning lamp provided on the instrument panel of a vehicle, as well as performs control to indicate the portion diagnosed to be in error. This indication of the portion diagnosed to be in error, such as the second steering assist force generating device 17, various functional portions inclusive of the second EPS control unit 39, and various sensors, can facilitate maintenance of the vehicle steering device 11.

After that, the second EPS control unit 39 completes a series of processing of the error diagnosis process.

It should be noted in the error diagnosis process shown in FIG. 2 that the error diagnosis process performed by the first EPS control unit 37 for a system of a first steering assist device, which at least includes the first steering torque sensor 23, the first assist motor 51, and the first EPS control unit 37, and the error diagnosis process performed by the second EPS control unit 39 for a system of a second steering assist device, which at least includes the second steering torque sensor 25, the second assist motor 57, and the second EPS control unit 39, are executed independently from each other.

This allows, even if some error occurs in the system of the first steering assist device which is one of the respective systems of the first and second steering assist devices, for maintaining the operation of the system of the second steering assist device which is normal, and then for avoiding a situation as much as possible where all the assisting forces for steering are lost, as will be described later.

Next, a description will be given of the assist control process performed by the vehicle steering device 11 according to the embodiment of the present invention, with reference to FIG. 3.

Figure 3:
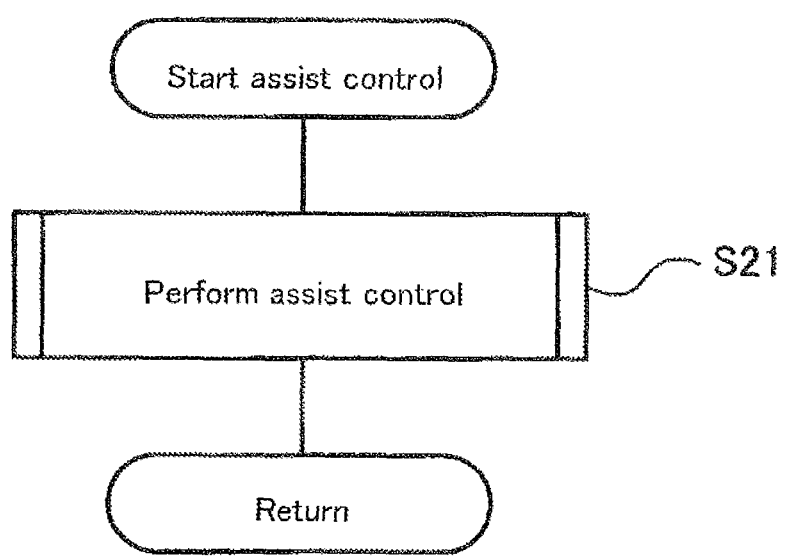
FIG. 3 is a flowchart showing an interrupt process for assist control in the operation of the vehicle steering device according to the embodiment of the present invention.

The first and second EPS control units 37, 39 switch their processing to the assist control process in FIG. 3 for execution, during the execution of the error diagnosis process in FIG. 2, for example, by a cyclic timer interrupt in every 0.5 milliseconds. During execution of the assist control process, processing of the error diagnosis process is suspended at a point where the interrupt has occurred. When the assist control process ends (returns), the processing of the error diagnosis process is resumed from the point where the interrupt has occurred.

To be in more detail, in step S21 in FIG. 3, the first EPS control unit 37 calculates, by a predetermined operation, the motor current command signal to be supplied to the first assist motor 51, based on the function SC1 of deviation between the first steering torque signals SA1, SB1 obtained from the first steering torque sensor 23, the detected vehicle speed value obtained from the vehicle speed sensor 29, and the engine speed information obtained from the engine speed sensor, to perform the assist control so that the first current value of the first assist motor 51 obtained from the first current sensor 93 matches with the motor current command value calculated above.

Similarly, in step S21 in FIG. 3, the second EPS control unit 39 calculates, by a predetermined operation, the motor current command signal to be supplied to the second assist motor 57, based on the function SC2 of deviation between the second steering torque signals SA2, SB2 obtained from the second steering torque sensor 25, the detected vehicle speed value obtained from the vehicle speed sensor 29, and the engine speed information obtained from the engine speed sensor, to perform the assist control so that the second current value of the second assist motor 57 obtained from the second current sensor 95 matches with the motor current command value calculated above.

It should be noted here that the assist control process performed by the first EPS control unit 37 for the system of the first steering assist device, and the assist control process performed by the second EPS control unit 39 for the system of the second steering assist device are executed independently from each other.

This allows, even if some error occurs in the system of the first steering assist device which is one of the respective systems of the first and second steering assist devices to cause the first assist motor 51 to fall into an uncontrollable and lost state, for the second EPS control unit 39, which belongs to the system of the second steering assist device working correctly, performing the assist control so that the second current value of the second assist motor 57 matches with the motor current command value, and then for avoiding a situation as much as possible where all the assist forces for steering are lost.

Operation of the vehicle steering device 11 according to an embodiment of the present invention will be described in more detail using a specific example. It is assumed that a disconnection error has occurred in the first assist motor 51. In this case, the system of the first steering assist device inclusive of the first steering torque sensor 23, the first assist motor 51, and the first EPS control unit 37 falls into a lost state, but the system of the second steering assist device inclusive of the second steering torque sensor 25, the second assist motor 57, and the second EPS control unit 39 is in an operable state.

Then, the second EPS control unit 39 in the operable system of the second steering assist device calculates, by a predetermined operation, a suitable assist force for assisting the steering force by the driver, to perform driving control of the second assist motor 57 so as to achieve the calculated assist force.

Assuming that electrical characteristics of the first and second assist motors 51, 57 are set to be mutually in common, the maximum integrated torque by the first and second assist motors 51, 57 is set to be "10" (the maximum torque of each of the first and second assist motors 51, 57 is "5"), and the required steering torque is "7", the second EPS control unit 39 performs driving control of the second assist motor 57 so as to achieve the assist force of "5" which is the maximum torque. This allows for applying an assist force of "5" for steering, which lacks the originally required steering torque of "7" by only "2", at the time of steering the steering wheel 13, to change the traveling direction of the vehicle without compromising the steering feeling of the driver so much. In general, the maximum torque required for steering when the vehicle is traveling is only a half or less as compared to that when the vehicle is stopped. The assist force of "5" is then sufficient for the actual steering when the vehicle is traveling. This concludes that the assist force for the actual steering lacks the required torque of "7" by "2" only when the vehicle is stopped.

Operational Effects of Vehicle Steering Device 11

The vehicle steering device 11 according to the embodiment of the present invention includes the steering wheel (steering member) 13 that is operated to change the traveling direction of the vehicle, and performs steering of the vehicle in response to operation of the steering wheel 13.

The vehicle steering device 11 according to the embodiment of the present invention includes the first steering assist device having at least the first steering torque sensor 23, the first assist motor 51 that applies an assist force for steering to the steering wheel 13, and the first EPS control unit (first control unit) 37, and the second steering assist device having at least the second steering torque sensor 25, the second assist motor 57 that applies an assist force for steering to the steering wheel 13, and the second EPS control unit (second control unit) 39.

In the vehicle steering device 11 according to the embodiment of the present invention, the first and second assist motors 51, 57 are mutually coupled via a steering force transmission mechanism. The first and second steering torque sensors 23, 25 are disposed between one of the first and second assist motors 51, 57 that is located near the steering wheel 13, and the steering wheel 13.

The first EPS control unit (first control unit) 37 performs driving control of the first assist motor 51 so as to apply at least the assist force based on the first steering torque detected by the first steering torque sensor 23. On the other hand, the second EPS control unit (second control unit) 39 performs driving control of the second assist motor 57 so as to apply at least the assist force based on the second steering torque detected by the second steering torque sensor 25. The first and second EPS control units (first and second control units) 37, 39 perform the driving control independently from each other.

In the vehicle steering device 11 according to the embodiment of the present invention, let's assume that an error has occurred in the first EPS control unit (first control unit) 37 in the system of the first steering assist device which is one of the first and second steering assist devices, and the first assist motor 51 has fallen into a state of rotating abnormally. Nevertheless, the first and second assist motors 51, 57 are mutually coupled via the steering force transmission mechanism. Besides, the first and second assist motors 51, 57 are located downstream (in the direction of transmitting the steering force) of the first and second steering torque sensors 23, 25, as viewed from the steering wheel (steering member) 13. This causes the steering torque to be applied to the steering wheel (steering member) 13 operated by the driver, in the direction to cancel the rotational force of the first assist motor 51 which has fallen into a state of rotating abnormally. The steering torque including this intention of the driver is inputted to the first and second steering torque sensors 23, 25. Accordingly, driving control of the second assist motor 57 is performed by the second EPS control unit (second control unit) 39 in the system of the second steering assist device which is normal, in the direction to suppress the rotational force of the first assist motor 51. As a result, a state of the first assist motor 51 rotating abnormally is eased.

Therefore, the vehicle steering device 11 according to the embodiment of the present invention allows, for example, even if some failure occurs in either one of the two control units 37, 39 which respectively control driving of the two assist motors 51, 57, for bringing negative effect due to such a failure under control quickly and soundly.

The vehicle steering device 11 according to the embodiment of the present invention preferably adopts a configuration in which the first and second assist motors 51, 57 have respective electrical characteristics to be set mutually in common (torque transmission characteristics for a pair of the steered wheels 67a, 67b are set to be in common).

Such a configuration allows, even if either of the first and second assist motors 51, 57 falls into a state of rotating abnormally, for avoiding a situation where the magnitude of the output of the motor which works abnormally overcomes the magnitude of the output of the motor which works correctly, to turn the steered wheels 67a, 67b to the degree of causing discomfort to the driver, because the magnitude of the output of the motor which works correctly is equal to the magnitude of the output of the motor which has fallen into a state of rotating abnormally.

In addition, the vehicle steering device 11 according to the embodiment of the present invention allows, as the first and second assist motors 51, 57 having the electrical characteristics set to be in common are mutually coupled via a steering force transmission mechanism, for suppressing the output characteristics of individual motors lower, for example approximately in half, as compared with the case of driving the steering with a single motor. This allows, for example, for supplying power to operate the motors from an existing battery having 12-volt capacitance, and no new booster circuit for 24-volt or 48-volt capacitance is required. As a result, individual motors can be reduced in size to secure the degree of freedom in layout design.

Further, the vehicle steering device 11 according to the embodiment of the present invention may adopt a configuration in which the first and second EPS control units (first and second control units) 37, 39 are respectively accommodated in a common housing.

Incidentally, it is assumed in the vehicle steering device 11 according to the embodiment of the present invention that at least one of the first and second steering assist devices operates correctly, as a prerequisite for obtaining the desired effect, such as bringing negative effect due to a failure under control rapidly and soundly.

This means that environmental arrangement for at least one of the first and second steering assist devices operating correctly becomes a key in order to increase the cases where the present invention exerts the desired effects.

From this perspective, the vehicle steering device 11 according to the embodiment of the present invention preferably adopts a configuration in which components in the first steering assist device and corresponding components in the second steering assist device are respectively arranged in the vehicle so as to be located in mutually different environments.

Adopting such a configuration, in which the components in the first steering assist device and the corresponding components in the second steering assist device are respectively arranged in the vehicle so as to be located in mutually different environments, can increase tolerance to abnormal conditions due to environmental changes such as the vehicle being submerged, as compared with the case where the components in the first steering assist device and the corresponding components in the second steering assist device are respectively arranged in the vehicle so as to be located in a common environment.

As a result, the vehicle steering device 11 according to the embodiment of the present invention allows for increasing cases of exerting desired advantageous effects, such as bringing negative effect due to a failure under control rapidly and soundly.

In addition, being located in mutually different environments in the configuration of the vehicle steering device 11 according to the embodiment of the present invention preferably includes being located at mutually different heights.

Adopting such a configuration, in which the components in the first steering assist device and the corresponding components in the second steering assist device are respectively arranged in the vehicle so as to be located at mutually different heights, can increase tolerance to abnormal conditions due to environmental changes such as the vehicle being submerged, as compared with the case where the components in the first steering assist device and the corresponding components in the second steering assist device are respectively arranged in the vehicle so as to be located at a common height.

As a result, the vehicle steering device 11 according to the embodiment of the present invention allows for further increasing cases of exerting desired advantageous effects, such as bringing negative effect due to a failure under control rapidly and soundly.

Further, the vehicle steering device 11 according to the embodiment of the present invention preferably adopts a configuration in which one of the first and second EPS control units (first and second control units) 37, 39 is installed inside the vehicle compartment, while the other thereof is installed outside the vehicle compartment.

Adopting such a configuration, in which one of the first and second EPS control units (first and second control units) 37, 39 is installed inside the vehicle, while the other thereof is installed outside the vehicle, can increase tolerance to abnormal conditions due to environmental changes such as the vehicle being submerged or temperature changes, as compared with the case where both the first and second EPS control units (first and second control units) 37, 39 are installed on the same side, i.e., inside or outside the vehicle.

As a result, the vehicle steering device 11 according to the embodiment of the present invention allows for furthermore increasing cases of exerting desired advantageous effects, such as bringing negative effect due to a failure under control rapidly and soundly.

Furthermore, the vehicle steering device 11 according to the embodiment of the present invention preferably adopts a configuration in which the first and second EPS control units (first and second control units) 37, 39 are installed in the vehicle so as to be located at mutually different heights.

Adopting such configuration, in which the first and second EPS control units (first and second control units) 37, 39 are installed in the vehicle so as to be located at mutually different heights, can increase tolerance to abnormal conditions due to environmental changes such as the vehicle being submerged, as compared with the case where both the first and second EPS control units (first and second control units) 37, 39 are installed in the vehicle so as to be located at a common height.

As a result, in the same way as above, cases can further be increased where the vehicle steering device 11 according to the embodiment of the present invention exerts desired advantageous effects, such as bringing negative effect due to a failure under control rapidly and soundly.

Moreover, the vehicle steering device 11 according to the embodiment of the present invention preferably adopts a configuration in which the first and second assist motors 51, 57 are set to have mutually different electrical characteristics, with one motor located in an environment requiring relatively high tolerance being set to have larger electrical characteristics than those of the other motor located in an environment requiring relatively low tolerance.

Adopting such a configuration, in which the first and second assist motors 51, 57 are set to have mutually different electrical characteristics (e.g., rated torque characteristics), with one motor located in an environment requiring relatively high tolerance being set to have larger electrical characteristics than those of the other motor located in an environment requiring relatively low tolerance, will allow, even if the other motor of the first and second assist motors 51, 57, which is located in the environment requiring relatively low tolerance, falls into a state of rotating abnormally, for suitably avoiding a situation in which the driver feels discomfort, because the one motor, which is located in the environment requiring relatively high tolerance and set to have larger electrical characteristics, strongly suppresses the negative effect caused by the abnormal rotation of the other motor.

Moreover, the vehicle steering device 11 according to the embodiment of the present invention preferably adopts a configuration in which a first electric wire that electrically connects the first assist motor 51 and the first EPS control unit (first control unit) 37, and a second electric wire that electrically connects the second assist motor 57 and the second EPS control unit (second control unit) 39 are routed so as to pass through mutually different paths within the vehicle.

Adopting such a configuration, in which the first and second electric wires are routed so as to pass through mutually different paths within the vehicle, will allow, even if one of the first and second electric wires is damaged, for suppressing probability of the other electric wire being damaged at the same time as low as possible.

As a result, cases can be increased where the vehicle steering device 11 according to the embodiment of the present invention exerts desired advantageous effects, such as bringing negative effect due to a failure under control rapidly and soundly.

Moreover, the vehicle steering device 11 according to the embodiment of the present invention preferably adopts a configuration in which at least one of the first and second steering torque sensors 23, 25 is a magnetostrictive torque sensor.

Adopting such a configuration, in which at least one of the first and second steering torque sensors 23, 25 is a magnetostrictive torque sensor, allows for strengthening the torsional rigidity of the steering wheel (steering member) 13. As a result, even with two steering torque sensors installed on the steering shaft, a situation can be suppressed where the steering shaft is excessively twisted due to the operating force of the steering wheel (steering member) 13 by the driver, to improve the driver's operation feeling for the steering.

Other Embodiments

The above-described embodiments are examples to embody the present invention. Therefore, it should not be interpreted that the technical scope of the invention be limited by these. The present invention can be embodied in various forms without departing from the spirit or the essential characteristics thereof.

Figure 4:
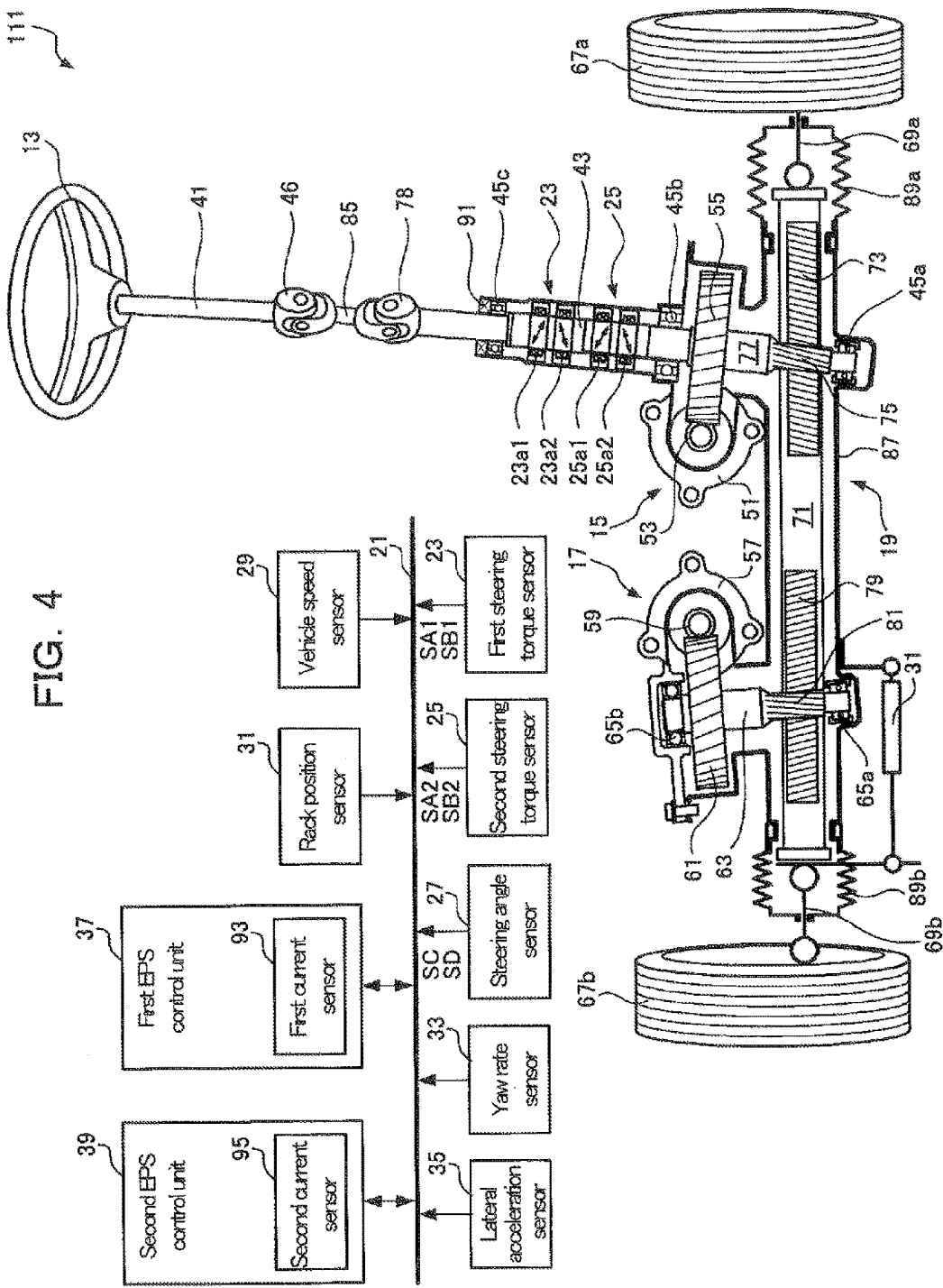
FIG. 4 is a block diagram showing the outline of a vehicle steering device according to another embodiment of the present invention.

For example, an embodiment of the present invention has been described by using an example in which the first and second steering assist force generating devices 15, 17 are installed with a distance and mutually coupled via a steering force transmission mechanism, but the present invention is not limited to this example. A configuration may be adopted as a vehicle steering device 111 according to another embodiment of the present invention shown in FIG. 4, in which the first and second steering assist force generating devices 15, 17 are arranged so as to be adjacent to each other via the rack shaft 71 which is in common.

In addition, an embodiment of the present invention has been described by way of using an example to adopt a magnetostrictive torque sensor as the first and second steering torque sensors 23, 25, but the present invention is not limited to this example. A torque detection system using a Hall element can also be adopted as the first and second steering torque sensors 23, 25.

The invention claimed is:

1. A vehicle steering, device inclusive of a steering member to be operated to change the traveling direction of a vehicle for performing steering of the vehicle in response to operation of the steering member, comprising:
    a first steering assist device having at least a first steering torque sensor, a first assist motor that applies an assist force for steering to the steering member, and a first control unit; and
    a second steering assist device having at least a second steering torque sensor, a second assist motor that applies an assist force for steering to the steering member, and a second control unit,
    wherein
    the first and second assist motors are physically separated from each other, but mutually coupled via a steering force transmission mechanism,
    the first and second steering torque sensors are arranged between the steering member and one of the first and second assist motors, which is located near the steering member, and
    the first control unit performs driving control of the first assist motor so as to apply an assist force at least based on a first steering torque detected by the first steering torque sensor, and
    the second control unit performs driving control of the second assist motor so as to apply an assist force at least based on a second steering torque detected by the second steering torque sensor,
    wherein the first and second control units perform the driving control independently from each other, and
    wherein a mechanical connection is maintained from the steering member through to wheels of the vehicle.

2. The vehicle steering device according to claim 1, wherein the first and second assist motors have respective electrical characteristics to be set mutually in common.

3. The vehicle steering device according to claim 1, wherein the first and second control units are respectively accommodated in a common housing.

4. The vehicle steering device according to claim 1, wherein components in the first steering assist device and corresponding components in the second steering assist device are respectively arranged in the vehicle so as to be located in mutually different environments.

5. The vehicle steering device according to claim 4, wherein being located in mutually different environments includes being located at mutually different heights.

6. The vehicle steering device according to claim 1, wherein one of the first and second control units is installed inside the vehicle compartment, while the other thereof is installed outside the vehicle compartment.

7. The vehicle steering device according to claim 6, wherein the first and second assist motors are set to have mutually different electrical characteristics.

8. The vehicle steering device according to claim 1, wherein the first and second control units are installed in the vehicle so as to be located at mutually different heights.

9. The vehicle steering device according to claim 1, wherein a first electric wire that electrically connects the first assist motor and the first control unit, and a second electric wire that electrically connects the second assist motor and the second control unit are routed so as to pass through mutually different paths within the vehicle.

10. The vehicle steering device according to claim 1, wherein at least one of the first and second steering torque sensors is a magnetostrictive torque sensor.

11. The vehicle steering device according to claim 1, wherein the one of the first and second assist motors which is located nearer the steering member is provided on a steering shaft connected to the steering member.

* * * * *